US012455686B1

(12) United States Patent
Liang et al.

(10) Patent No.: US 12,455,686 B1
(45) Date of Patent: Oct. 28, 2025

(54) METHOD, ELECTRONIC DEVICE, AND PROGRAM PRODUCT FOR RECLAIMING STORAGE SPACE

(71) Applicant: Dell Products L.P., Round Rock, TX (US)

(72) Inventors: Shuangshuang Liang, Zunyi (CN); Chaojun Zhao, Chengdu (CN); Yang Zhang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/667,218

(22) Filed: May 17, 2024

(30) Foreign Application Priority Data

Apr. 26, 2024 (CN) .......................... 202410516879.9

(51) Int. Cl.
*G06F 3/06* (2006.01)
(52) U.S. Cl.
CPC ............ *G06F 3/0608* (2013.01); *G06F 3/064* (2013.01); *G06F 3/0673* (2013.01)
(58) Field of Classification Search
CPC ....... G06F 3/0608; G06F 3/064; G06F 3/0673
See application file for complete search history.

(56) References Cited

U.S. PATENT DOCUMENTS

| 9,189,392 | B1 * | 11/2015 | Neppalli | G06F 3/0688 |
| 11,106,578 | B2 * | 8/2021 | Cho | G06F 12/0253 |
| 11,520,522 | B2 * | 12/2022 | Dalmatov | G06F 3/0659 |
| 11,861,201 | B2 * | 1/2024 | Chawla | G06F 3/0608 |
| 12,289,444 | B2 * | 4/2025 | Park | H04N 19/105 |
| 2008/0155175 | A1 * | 6/2008 | Sinclair | G06F 12/0646 711/E12.078 |
| 2011/0320709 | A1 * | 12/2011 | Han | G06F 3/061 711/E12.019 |
| 2018/0150237 | A1 * | 5/2018 | Koo | G06F 3/068 |
| 2019/0227927 | A1 * | 7/2019 | Miao | G06F 3/0613 |
| 2020/0334139 | A1 * | 10/2020 | Hwang | G06F 12/0246 |
| 2021/0240613 | A1 * | 8/2021 | Na | G06F 12/0253 |
| 2023/0058424 | A1 * | 2/2023 | Frolikov | G06F 3/0659 |

OTHER PUBLICATIONS

P. R. Wilson, "Uniprocessor Garbage Collection Techniques," International Workshop on Memory Management, Sep. 1992, 67 pages.
Wikipedia, "Garbage Collection (computer science)," https://en.wikipedia.org/wiki/Garbage_collection_(computer_science), Apr. 24, 2024, 11 pages.

* cited by examiner

*Primary Examiner* — Sean D Rossiter
(74) *Attorney, Agent, or Firm* — Ryan, Mason & Lewis, LLP

(57) ABSTRACT

Embodiments of the present disclosure provide a method, an electronic device, and a program product for reclaiming a storage space. The method includes: determining the number of a plurality of blocks to be merged into one block based on a space usage of a storage system; selecting a block combination for merging from a plurality of partially used blocks of the storage system, the block combination including the determined number of partially used blocks; and reclaiming a storage space from the storage system by merging the partially used blocks in the block combination into one block. In this way, resources of the storage system can be efficiently utilized, so that more partially used blocks are reclaimed, thereby reclaiming the storage space more effectively.

20 Claims, 10 Drawing Sheets

| 90/2 | 92/4 | 91/5 | 98/6 | | | | | | | | | |
|------|------|------|------|---|---|---|---|---|---|---|---|---|
| 81/1 | 80/2 | 83/7 | | | | | | | | | | |
| 72/2 | 77/4 | | | | | | | | | | | |
| 60/6 | 60/3 | | | | | | | | | | | |
| 52/1 | 53/2 | | | | | | | | | | | |
| 49/1 | 47/2 | 42/2 | 48/3 | 43/3 | 40/3 | 43/5 | 44/4 | 48/3 | 40/4 | 41/5 | 46/6 | 49/3 |
| 39/2 | 37/1 | 33/5 | | | | | | | | | | |
| 27/2 | 21/1 | 26/5 | 25/6 | 24/4 | 22/5 | 21/3 | 22/2 | | | | | |
| 12/2 | 18/2 | 13/4 | | | | | | | | | | |
| 6/2 | 5/3 | | | | | | | | | | | |

Fig. 7A

| | | | | | | | | | | | | | |
|---|---|---|---|---|---|---|---|---|---|---|---|---|---|
| 90<= usage <100% | 90 | 92 | 91 | 98 | | | | | | | | | |
| 80<= usage <90% | 81 | 80 | 83 | | | | | | | | | | |
| 70<= usage <80% | 72 | 77 | | | | | | | | | | | |
| 60<= usage <70% | 60 | 60 | | | | | | | | | | | |
| 50<= usage <60% | 52 | 53 | | | | | | | | | | | |
| 40<= usage <50% | 49 | 47 | 42 | 48 | 43 | 40 | 43 | 44 | 48 | 40 | 41 | 46 | 49 |
| 30<= usage <40% | 39 | 37 | 33 | | | | | | | | | | |
| 20<= usage <30% | 27 | 21 | 26 | 25 | 24 | 22 | 21 | 22 | | | | | |
| 10<= usage <20% | 12 | 18 | 13 | | | | | | | | | | |
| 0< usage <10% | 6 | 5 | | | | | | | | | | | |

Fig. 7B

| Number of back pointers =1 | 81 | 52 | 48 | 49 | 37 | 21 |    |    |    |    |    |    |
|---|---|---|---|---|---|---|---|---|---|---|---|---|
| Number of back pointers =2 | 90 | 80 | 72 | 53 | 47 | 42 | 39 | 27 | 22 | 12 | 18 | 6 |
| Number of back pointers =3 | 60 | 49 | 48 | 40 | 43 | 21 | 5  |    |    |    |    |   |
| Number of back pointers =4 | 92 | 77 | 44 | 40 | 24 | 13 |    |    |    |    |    |   |
| Number of back pointers =5 | 91 | 43 | 41 | 33 | 26 | 22 |    |    |    |    |    |   |
| Number of back pointers =6 | 98 | 60 | 46 | 25 |    |    |    |    |    |    |    |   |
| Number of back pointers =7 | 83 |    |    |    |    |    |    |    |    |    |    |   |

Fig. 7C

| Number of back pointers =1 | 81 | 52 | 48 | 49 | 37 | 21 |    |    |    |    |    |    |
|---|---|---|---|---|---|---|---|---|---|---|---|---|
| Number of back pointers =2 | 90 | 80 | 72 | 53 | 47 | 42 | 39 | 27 | 22 | 12 | 18 | 6 |
| Number of back pointers =3 | 60 | 49 | 48 | 40 | 43 | 21 | 5  |    |    |    |    |   |
| Number of back pointers =4 | 92 | 77 | 44 | 40 | 24 | 13 |    |    |    |    |    |   |
| Number of back pointers =5 | 91 | 43 | 41 | 33 | 26 | 22 |    |    |    |    |    |   |
| Number of back pointers =6 | 98 | 60 | 46 | 25 |    |    |    |    |    |    |    |   |
| Number of back pointers =7 | 83 |    |    |    |    |    |    |    |    |    |    |   |

Fig. 7D

| Number of back pointers =1 |    |    |    |    |    |    |    |    |    |    |    |    |
|---|---|---|---|---|---|---|---|---|---|---|---|---|
| Number of back pointers =2 | 90 | 80 | 72 |    | 47 | 42 | 39 |    |    |    |    | 6 |
| Number of back pointers =3 | 60 | 49 | 48 | 40 | 43 | 21 |    |    |    |    |    |   |
| Number of back pointers =4 | 92 | 77 | 44 | 40 |    |    |    |    |    |    |    |   |
| Number of back pointers =5 | 91 | 43 | 41 |    |    |    |    |    |    |    |    |   |
| Number of back pointers =6 | 98 | 60 | 46 |    |    |    |    |    |    |    |    |   |
| Number of back pointers =7 | 83 |    |    |    |    |    |    |    |    |    |    |   |

Fig. 7E

METHOD, ELECTRONIC DEVICE, AND PROGRAM PRODUCT FOR RECLAIMING STORAGE SPACE

RELATED APPLICATION

The present application claims priority to Chinese Patent Application No. 202410516879.9, filed Apr. 26, 2024, and entitled "Method, Electronic Device, and Program Product for Reclaiming Storage Space," which is incorporated by reference herein in its entirety.

FIELD

Embodiments of the present disclosure relate to the field of computers, and more specifically, relate to a method, an electronic device, and a computer program product for reclaiming storage space.

BACKGROUND

Garbage collection (GC) mechanisms are widely used in storage systems. When a storage system is used by a user for a long time, many partially used blocks that can no longer be used will be introduced. To free up more available space and reduce fragments, GC can be used as a backend strategy to merge two partially used blocks into one block and generate an additional available block. However, existing GC mechanisms have many limitations, and thus have difficulty meeting increasingly complex performance requirements. Therefore, it is necessary to further improve collection strategies of GC mechanisms to provide more available storage space for storage systems in a more efficient way.

SUMMARY

According to embodiments of the present disclosure, a technical solution for reclaiming a storage space is provided.

According to a first aspect of the present disclosure, a method for reclaiming a storage space is provided. The method includes: determining the number of a plurality of blocks to be merged into one block based on a space usage of a storage system; selecting a block combination for merging from a plurality of partially used blocks of the storage system, the block combination including the determined number of partially used blocks; and reclaiming a storage space from the storage system by merging the partially used blocks in the block combination into one block.

In this way, the number of the partially used blocks participating in the merging can be flexibly set according to the space usage of the storage system. For example, when the space usage of the storage system is high, more blocks can be merged into one block to free up more available space; and when the space usage is low, fewer blocks can be merged into one block to minimize the adverse effects of data merging on the storage system. Therefore, according to embodiments of the present disclosure, resources of the storage system can be efficiently utilized, so that more partially used blocks can be added to a space reclaiming task, thereby reclaiming the storage space more effectively.

According to a second aspect of the present disclosure, an electronic device is provided. The electronic device includes at least one processor, and at least one memory coupled to the at least one processor and storing instructions, wherein the instructions, when executed by the at least one processor, cause the electronic device to perform actions. The actions include: determining the number of a plurality of blocks to be merged into one block based on a space usage of a storage system; selecting a block combination for merging from a plurality of partially used blocks of the storage system, the block combination including the determined number of partially used blocks; and reclaiming a storage space from the storage system by merging the partially used blocks in the block combination into one block.

According to a third aspect of the present disclosure, a computer program product is provided. The computer program product is tangibly stored on a non-transitory computer-readable storage medium and comprises machine-executable instructions, wherein the machine-executable instructions, when executed by a machine, cause the machine to perform actions. The actions include determining the number of a plurality of blocks to be merged into one block based on a space usage of a storage system; selecting a block combination for merging from a plurality of partially used blocks of the storage system, the block combination including the determined number of partially used blocks; and reclaiming a storage space from the storage system by merging the partially used blocks in the block combination into one block.

BRIEF DESCRIPTION OF THE DRAWINGS

The above and other features, advantages, and aspects of embodiments of the present disclosure will become more apparent with reference to the drawings and the Detailed Description below. In the drawings, identical or similar reference numerals represent identical or similar elements, in which:

FIGS. 7A-7E illustrate schematic diagrams of examples of selecting partially used blocks to perform space reclaiming according to embodiments of the present disclosure.

DETAILED DESCRIPTION

Figure 1:
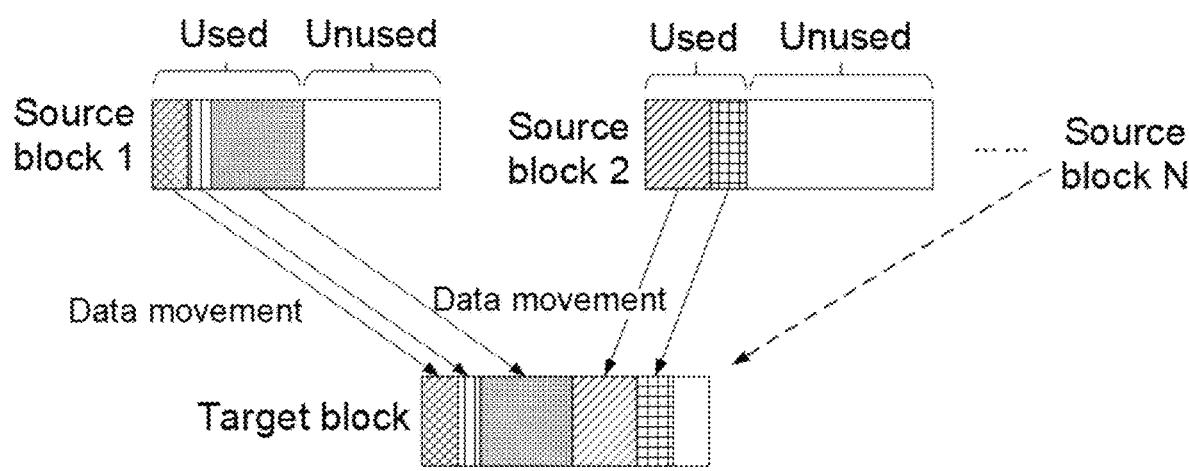
FIG. 1 is a schematic diagram of merging a plurality of source blocks into a target block to achieve storage space reclaiming according to embodiments of the present disclosure.

Illustrative embodiments of the present disclosure will be described below in further detail with reference to the drawings. Although the drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below. Additionally, all specific numerical values herein are examples, which are provided only to aid in understanding, and are not intended to limit the scope.

In an existing GC mechanism, two blocks that have been partially used (also called "source blocks") are selected, and data of the two blocks is moved to one block (called a "target block"), so that a new available space of one block is freed up, where a sum of data of the source blocks should not exceed the size of the target block (i.e., the sum of usages does not exceed 100%). In order to select a suitable pair of source blocks to reclaim as much storage space as possible, an existing approach is to sort or group partially used blocks according to their usages. For example, the partially used blocks in a storage system are divided into 10 queues at an interval of 10%, the 10 queues respectively including the partially used blocks whose usages are 90-100%, 80-89%, etc. Then, a pair of blocks is selected from a high-usage queue and a low-usage queue in a complementary manner. For example, blocks are selected respectively from a queue with a usage of 90-100% and a queue with a usage of 0-9%, blocks are selected respectively from a queue with a usage of 80-89% and a queue with a usage of 10-19%, and so on in a similar manner. However, whether a condition that a sum of usages does not exceed 100% is met is checked, and if so, the blocks are selected for merging.

However, there are some problems in the above-mentioned method for reclaiming a space. First, when the usages of the partially used blocks are unevenly distributed in these queues, the number of block pairs satisfying the condition will be greatly reduced. At this point, a large number of partially used blocks will not be reclaimed. Similarly, when the usages of the partially used blocks are not evenly distributed, fixing the number of the blocks participating in the merging to two blocks will make the reclaiming efficiency become a bottleneck. In addition, a process of space reclaiming involves data movement between data blocks, which will consume corresponding resources. Use of the same block selection strategy when the space of the storage system is sufficient or scarce will lead to ineffective utilization of system resources.

In view of this, illustrative embodiments of the present disclosure provide a method for reclaiming a storage space. The method can adjust a reclaiming strategy adaptively according to a space usage of a storage system, and change the number of partially used blocks participating in merging. For example, when the space usage of the storage system is high, more blocks can be merged into one block to free up more available space; and when the space usage is low, fewer blocks can be merged into one block to minimize the adverse effects of data merging on the storage system. In some implementations, a usage threshold is further introduced as a condition for whether to select a block combination to be merged, to further improve the efficiency of space reclaiming. Some example embodiments of the present disclosure will be described below with reference to FIGS. 1-8.

FIG. 1 is a schematic diagram of merging a plurality of source blocks into a target block to achieve storage space reclaiming according to embodiments of the present disclosure. In a storage system, blocks may refer to data storage units having a fixed size, such as 512 KB, 4 KB, . . . , 512 KB, and 2 MB, and the sizes of the blocks are not limited in the present disclosure. The blocks herein may refer to available storage space on a physical storage device such as a non-volatile memory or a volatile memory, a hard disk device (HDD), and a random access memory (RAM).

One or more logical blocks of the storage system can be mapped to the same block on a physical storage device. In other words, data of a plurality of logical blocks of the storage system can be stored on the same physical block, and each of the logical blocks has a pointer for indicating a location where its data is stored on the physical block, thus achieving data compression. There is a limitation to the number of logical blocks that can be associated with each physical block, and the number depends on the implementation. For example, it can be 4, 8, etc., which is not limited in the present disclosure. Accordingly, the physical block has an associated back pointer to inversely map to the logical block, and the back pointer indicates a mapping from a physical address to a logical address for data retrieval and management.

FIG. 1 illustrates a plurality of source blocks that can be merged into a target block, including a source block 1, a source block 2, . . . , a source block N, and each of the source blocks includes a used space and an unused space, that is, each of the source blocks is partially used. The terms "source block" and "partially used block" herein are used interchangeably. The source block can store data of a plurality of logical blocks. For example, in FIG. 1, the source block 1 has data of three logical blocks, and the source block 2 has data of two logical blocks. Accordingly, the source block 1 has three associated back pointers, and the source block 2 has two associated back pointers.

In order for the source blocks 1-N to be merged into the target block to free up more available storage space, in some embodiments, the following conditions need to be met: a sum of data usages of the source blocks 1-N does not exceed 100%, that is, the target block can accommodate all the data; and also, a sum of the numbers of back pointers of the source blocks 1-N should not exceed the maximum limit number of the storage system, e.g., eight, that is, the target block can store data of eight logical blocks at most. It is understood that the partially used blocks of the storage system refer to those whose data usages are below 100% and their numbers of associated back pointers are below the maximum limit number of the storage system.

Generally, in order to obtain more new space (that is, to reduce the total number of partially used blocks), it is advantageous to achieve a greater data usage and a greater number of back pointers on the target block. Additionally, a GC mechanism as a backend task should perform data movement as little as possible to avoid affecting the system performance. Embodiments of the present disclosure take these factors into account in order to achieve more efficient storage space reclaiming and reduce computing resources occupied by space reclaiming tasks.

Figure 2:
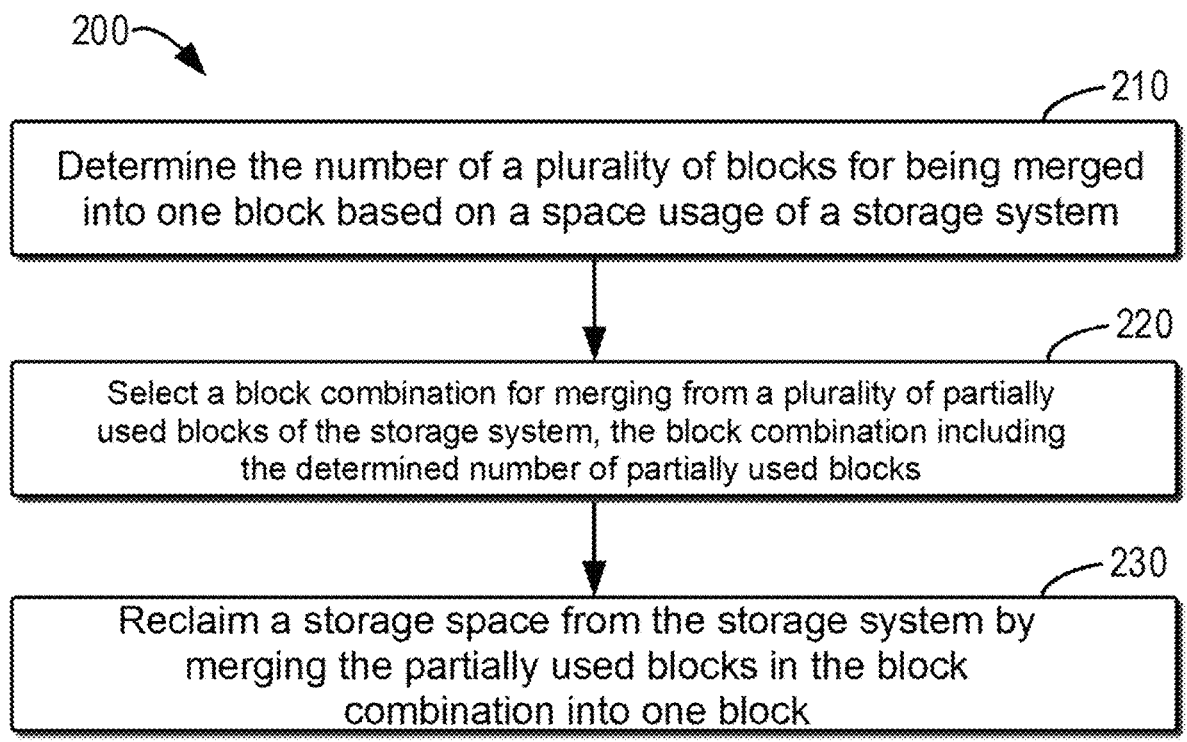
FIG. 2 is a flow chart of a method for reclaiming a storage space according to embodiments of the present disclosure.

FIG. 2 is a flow chart of a method 200 for reclaiming a storage space according to embodiments of the present disclosure. It is to be understood that the method 200 may also include additional actions not shown and/or may omit actions shown, and the scope of the present disclosure is not limited in this regard. For case of illustration, the method 200 is described with reference to FIG. 1.

At block 210, the number of a plurality of blocks for being merged into one block is determined based on a space usage of a storage system. The space usage of the storage system can be referred to as system space usage (SU) for short, which refers to a used space of the storage system. In some embodiments, the SU can be expressed as a ratio of the number of all used blocks (including partially used blocks and fully used blocks) to the number of all available blocks, and has a value between 0 and 1. Here, the number of a plurality of blocks for being merged into one block refers to the number of partially used blocks to be merged, or in other words the number of partially used blocks that can be selected and participate in being merged into one block during a storage space reclaiming process, and it can also be referred to as the number of source partially used blocks (NSP) for short. For example, as mentioned above, an existing storage reclaiming mechanism uses a pattern of NSP=2, that is, a pair of source blocks is merged into a target block. In some embodiments, the NSP may range from 2 to 8 (i.e., 8 is the number of logical blocks allowed to be carried, which is equal to the maximum number of back pointers). After the NSP is determined, the system selects the source blocks based on the determined NSP value, with reference to FIG. 1, where when NSP=N, it indicates that N source blocks are merged into one target block.

Figure 3:
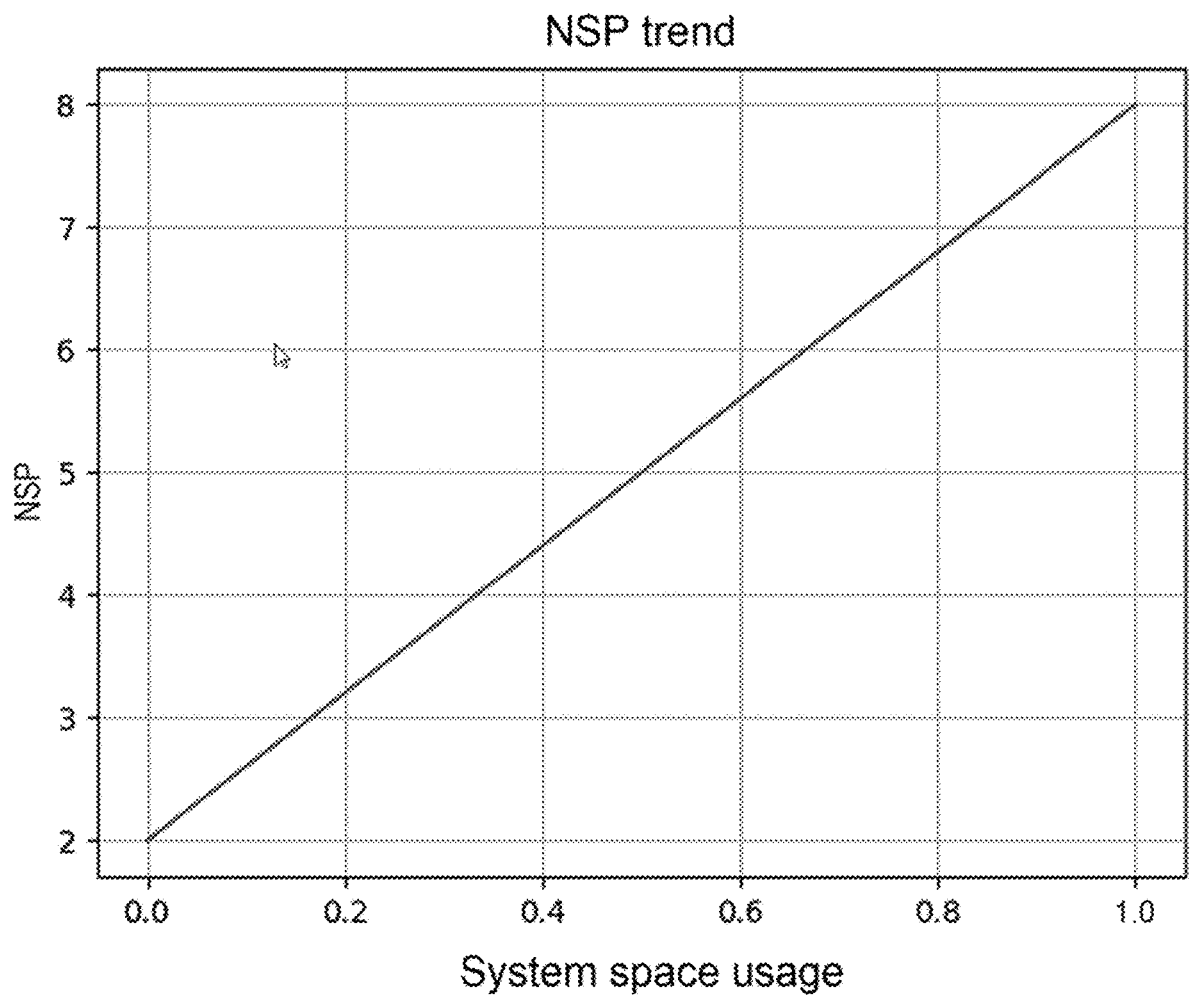
FIG. 3 illustrates a graph of a relationship between the number of source blocks participating in the merging and a system space usage according to embodiments of the present disclosure.

In a process of reclaiming a storage space, data of NSP source blocks is moved to a target block, thus freeing up a space of NSP−1 blocks. Therefore, the larger the NSP value, the more space is freed up. In some embodiments, the NSP value can be implemented to increase with the increase of the SU to free up more storage space, thereby reducing the SU faster and ensuring the performance of the storage system. In some implementations, a variation of the NSP value with the SU can be reflected by the following Equation (1):

$$NSP=\lfloor 6\times SU+2 \rfloor (0\leq SU\leq 1) \quad (1)$$

where $\lfloor \ \rfloor$ is a rounded-down symbol. FIG. 3 illustrates a graph of a relationship between NSP and SU according to Equation (1). It is understood that the NSP value can also be defined in other ways than by Equation (1).

At block 220, a block combination for merging is selected from a plurality of partially used blocks of the storage system, the block combination including the determined number of partially used blocks. In some embodiments, the block combination can be selected based on usages of the partially used blocks of the storage system and/or the numbers of associated back pointers. As mentioned above, the target block and source blocks in the same storage system have the same size, so the sum of usages of all the blocks in the selected block combination should be less than 100%. In order to select appropriate source blocks, some embodiments of the present disclosure further provide a threshold related to the usages of the blocks to screen out more source blocks for merging. The threshold can be called a source block merging threshold (SBMT) or a usage threshold. If the sum of usages of all blocks in the block combination exceeds the threshold, the blocks of the block combination can be merged as source blocks into a target block.

In some embodiments, the SBMT can be determined based on the SU. For example, the SBMT can decrease as the SU increases. In other words, when the SU is higher, a decrease in the threshold can encourage more partially used blocks to participate in merging, thereby reducing the SU as much as possible and ensuring the performance of the storage system. On the contrary, when the SU is relatively low, an increase in the threshold can inhibit the partially used blocks to participate in merging, so that data movement caused by the merging can be reduced, thereby reducing the impact on the current performance of the system.

In some implementations, a variation of the SBMT with the SU can be reflected by the following Equation (2):

$$SBMT=0.9-0.2\times SU(0\leq SU\leq 1) \quad (2)$$

Figure 4:
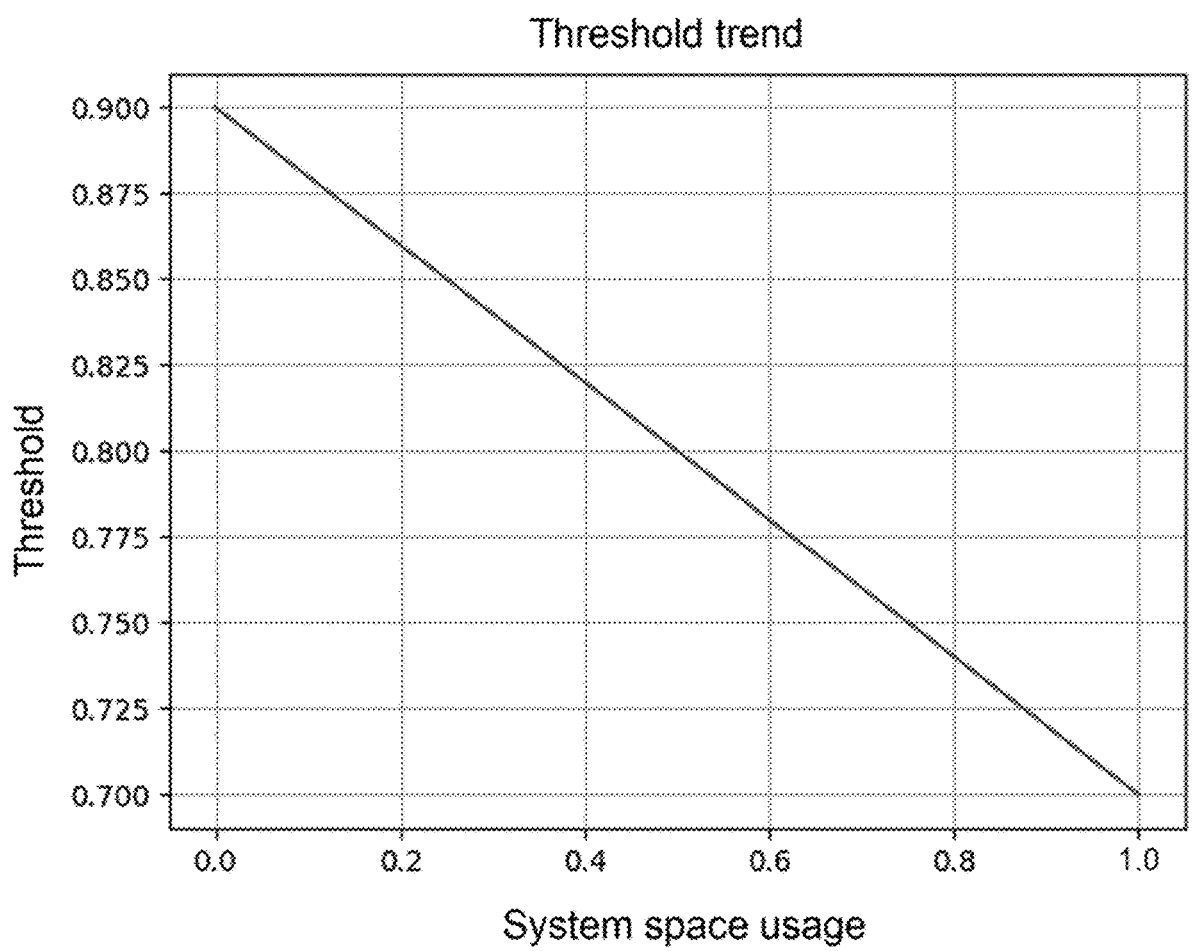
FIG. 4 illustrates a graph of a relationship between a source block merging threshold (SBMT) and a system space usage (SU) according to embodiments of the present disclosure.

FIG. 4 illustrates a graph of a relationship between SBMT and SU according to Equation (2). It is understood that the SBMT value can also be defined in other ways than by Equation (2). In some embodiments, the number of back pointers of partially used blocks may be taken into account when a block combination for merging is selected. A sum of the numbers of back pointers of partially used blocks in the selected block combination does not exceed a predetermined threshold, that is, the maximum number of logical blocks allowed to be carried by a single block set by the storage system, that is, the maximum number of back pointers. In order to merge as many partially used blocks as possible and reduce the computational complexity of the space reclaiming process, the block combination can be selected such that the sum of the numbers of back pointers of partially used blocks in the block combination is equal to the maximum number of back pointers.

Assuming that the maximum number of back pointers of a block is 8 (meaning that this is a fully used block), the number of back pointers of a partially used block is an integer ranging from 1 to 7. Information about the partially used blocks of the current storage system is shown in Table 1 below. There are n partially used blocks in total, where the usage Ui ranges from 0 (excluded) to 100% (excluded), and the number of back pointers BPi is an integer ranging from 1 to 7.

TABLE 1

| Partially Used Block | Usage | Back Pointer |
|---|---|---|
| 1 | U1 | BP1 |
| 2 | U2 | BP2 |
| 3 | U3 | BP3 |
| ... | ... | ... |
| n | Un | BPn |

In some embodiments, the partially used blocks in the selected block combination satisfy the following Equation (3):

$$\sum_{i=1}^{NSP} BP_i = 8 \quad (3)$$

In some embodiments, the partially used blocks may be grouped to form a back pointer table based on the numbers of corresponding back pointers of the partially used blocks of the storage system (as shown in Table 1). An appropriate block combination is then selected by traversing the back pointer table.

Figure 5A:
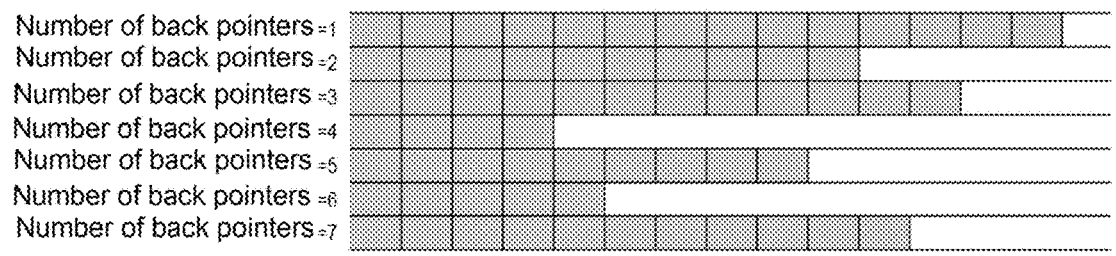
FIGS. 5A-5D illustrate examples of a back pointer table associated with partially used blocks of a storage system according to embodiments of the present disclosure.

FIG. 5A illustrates an example of a back pointer table associated with the partially used blocks of the storage system. In FIG. 5A, the partially used blocks with different numbers of back pointers are grouped to corresponding groups or queues.

With reference to Equation (3) above, the combination patterns of the numbers of back pointers satisfying this condition are as follows:

$$NSP=2, BP_{list}=\{(1,7),(2,6),(3,5),(4,4)\}$$

$$NSP=3, BP_{list}=\{(1,1,6),(1,2,5),(1,3,4),(2,2,4),(2,3,3)\}$$

$$NSP=4, BP_{list}=\{(1,1,2,4),(1,2,2,3),(1,1,3,3),(2,2,2,2), (1,1,1,5)\}$$

$$NSP=5, BP_{list}=\{(1,1,1,2,3),(1,1,2,2,2),(1,1,1,1,4)\}$$

$$NSP=6, BP_{list}=\{(1,1,1,1,1,3),(1,1,1,1,2,2)\}$$

$$NSP=7, BP_{list}=\{(1,1,1,1,1,1,2)\}$$

$$NSP=8, BP_{list}=\{(1,1,1,1,1,1,1,1)\}$$

where for NSP=2, that is, a case that two blocks are selected to be merged, a (1,7) pattern indicates that a partially used block is respectively selected from two groups whose numbers of back pointers are 1 and 7 to form a block combination; and a (2,6) pattern indicates that a partially used block is respectively selected from two groups whose numbers of back pointers are 2 and 6 to form a block combination, and so on in a similar fashion. For NSP=3, that is, a case that three blocks are selected to be merged, a (1,1,6) pattern indicates that two blocks are selected from the group whose number of back pointers is 1 and a block is selected from the group whose number of back pointers is 6 to form a block combination, and so on in a similar fashion. For other cases of sums of the numbers of back pointers (e.g., less than 8), the combination patterns are similar, and all possible combinations can be covered by traversing.

In some embodiments, the selected block combination may also be required to meet the condition of a usage threshold, as shown in Equation (4) below, to obtain a block combination with a high sum of usages by filtering:

$$SBMT \le \sum_{i=1}^{NSP} U_i \le 100\% \quad (4)$$

Figure 5B:
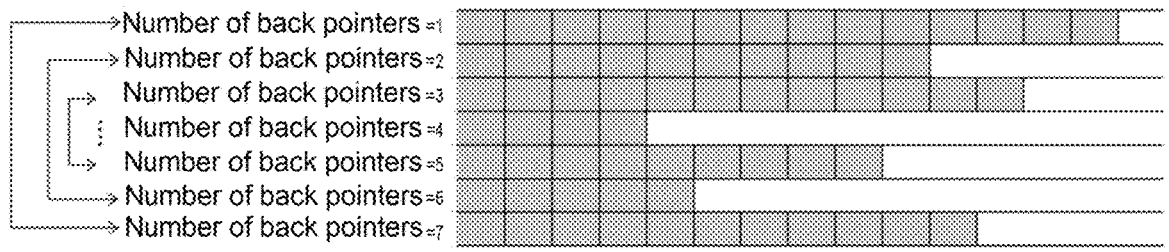

FIG. 5B illustrates an example of selecting a block combination from the back pointer table when NSP=2, i.e., performing a combination pattern of $BP_{list}=\{(1,7), (2,6), (3,5), (4,4)\}$. In some embodiments, the block combination filtered by Equation (4) is determined as the selected block combination awaiting a merge operation.

When NSP–3, $BP_{list}=\{(1,1,6), (1,2,5), (1,3,4), (2,2,4), (2,3,3)\}$, and there are cases where two different combinations select source blocks from the same group. For example, both (1,1,6) and (1,2,5) select source blocks from the group whose number of back pointers is 1. In this case, different combinations can be performed in turn, but it should be noted that the blocks that have been selected should be excluded to avoid repeated selection.

Figure 5C:
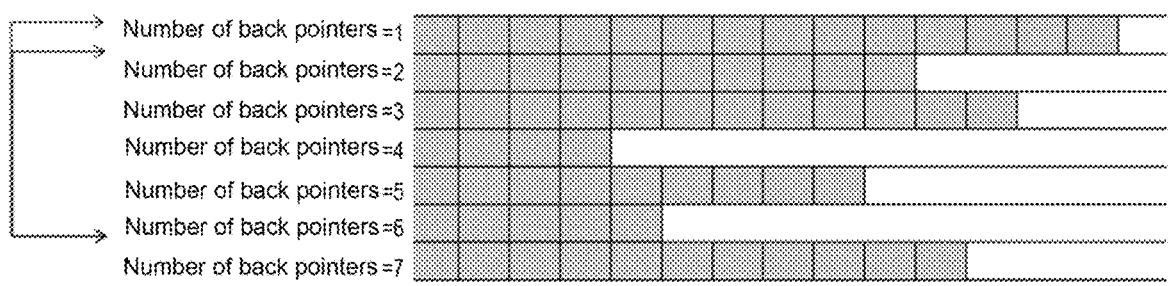
Figure 5D:
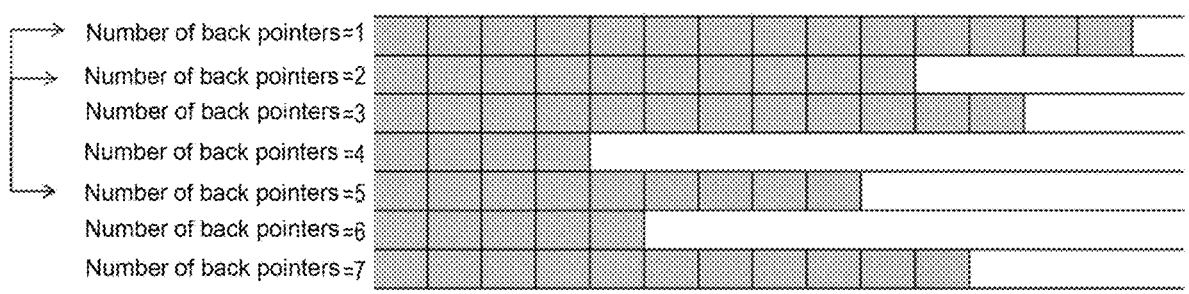

FIG. 5C illustrates an example of source block selection based on a combination pattern of (1,1,6) when NSP=3. After the selection in the combination pattern of (1,1,6) is performed, the back pointer table is updated, and then a combination pattern of (1,2,5) is used to select source blocks, as shown in FIG. 5D.

At block 230, a storage space is reclaimed from the storage system by merging the partially used blocks in the block combination into one block. In some embodiments, the source blocks selected at block 220 form a block combination, and after all selections are completed, the source blocks are merged into a target block at block 230. Specifically, in the storage system, data of the source blocks is moved to the target block, a corresponding mapping from a logical address to a target address is updated, and the target block is also associated with corresponding back pointers. It can be understood that according to Equation (3), when the number of back pointers of the target block reaches the maximum number, the target block can be considered as a fully used block.

Figure 6:
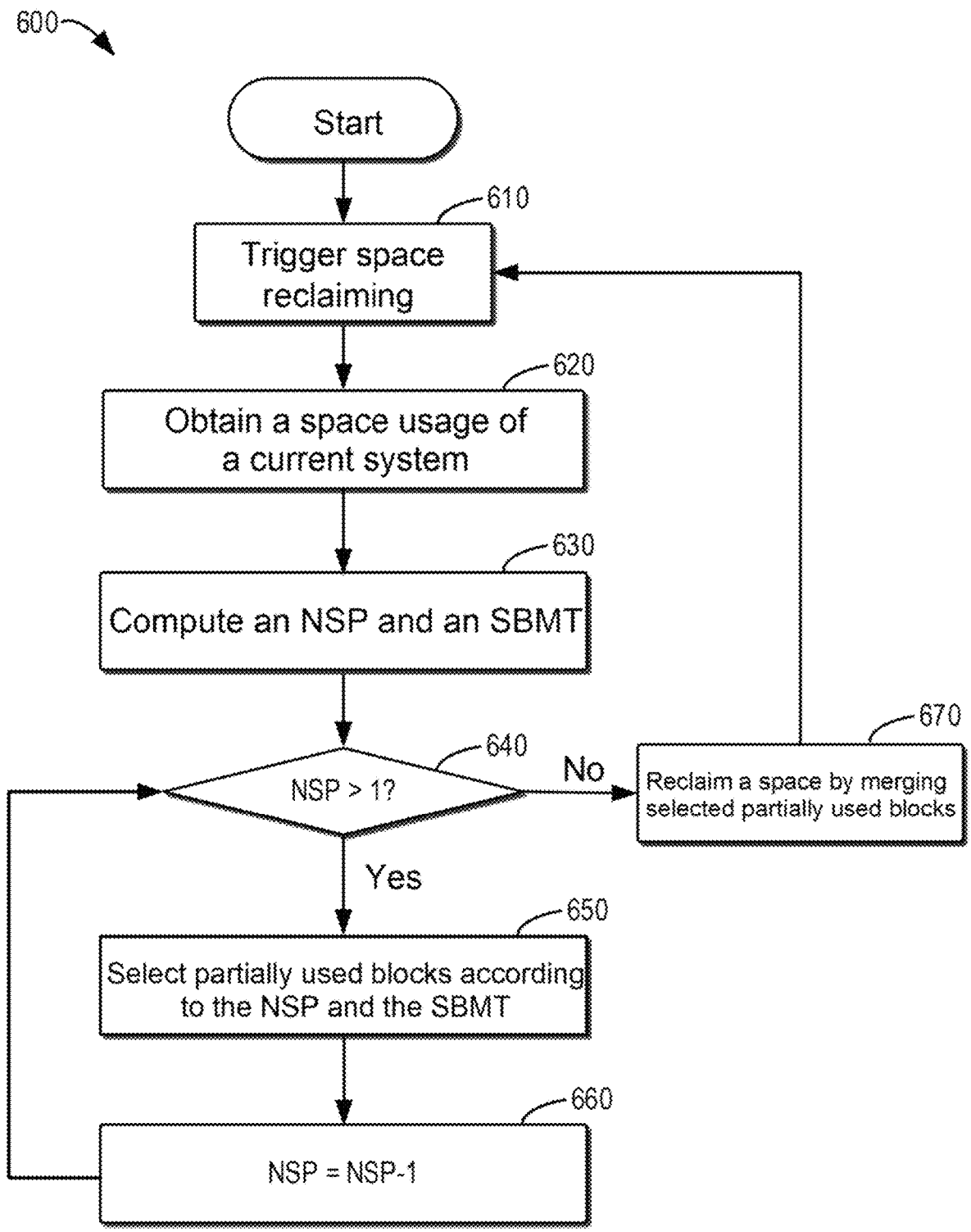
FIG. 6 is a flow chart of a method for reclaiming a storage space implemented in a storage system according to embodiments of the present disclosure.

FIG. 6 is a flow chart of a method 600 for reclaiming a storage space implemented in a storage system according to embodiments of the present disclosure. The method 600 may be an example implementation of the method 200.

At block 610, a storage space reclaiming task is triggered. In some implementations, the space reclaiming task can be triggered either periodically or in response to user actions, or in response to events (e.g., an SU reaching a certain threshold).

At block 620, a space usage of a current storage system is obtained. The space usage of the system can be determined based on a ratio of a used space to a total available space.

At block 630, an NSP and an SBMT are computed based on the space usage of the system. For example, the NSP and the SBMT are computed according to Equation (1) and Equation (2) provided above. It can be understood that other computation approaches are also applicable.

At block 640, whether the NSP is greater than 1 is determined. When the NSP is greater than 1, the method 600 can proceed to block 650 in which the partially used blocks are selected based on the NSP and the SBMT to form a candidate block combination that waits to be merged into a target block. Then, at block 660, the NSP is decreased by 1, and the method returns to block 640. When it is determined that the NSP is less than or equal to 1 at block 640, the method 600 can proceed to block 670 in which space reclaiming is implemented by merging the selected partially used blocks. Then, the method returns to block 610 to wait for a next space reclaiming task to be triggered.

In the method 600, block merging with a larger NSP is performed first, that is, more source blocks are merged into one target block first to free up more storage space. Then, the NSP is decreased progressively and block merging with a smaller NSP is performed until the NSP is equal to or less than 1, that is, there is no need to select more source blocks to merge.

To better understand a source block selection strategy provided in embodiments of the present disclosure, illustration is made below with reference to FIGS. 7A-7E.

FIG. 7A illustrates information about partially used blocks that can be used in a GC process, in which each cell represents the information about one block (m/n), where m represents a usage of the block, and n represents the number of associated back pointers. In an existing solution, 10 queues are obtained based on the usage level, as shown in FIG. 7B. Then, two source blocks are selected from the paired queues to merge, and as a result, the following 10 pairs of source blocks are obtained: {90, 6}, {92, 5}, {81, 12}, {80, 18}, {83, 13}, {72, 27}, {77, 21}, {60, 39}, {60, 37}, {53, 47}. Here, the usage is used as identification information for the source blocks without affecting understanding. As a result, the storage space that can be freed up is 10 blocks.

According to some embodiments of the present disclosure, when a GC task is triggered, assuming the SU is 20%, it is computed that NSP=3 and SBMT=86%. According to some embodiments of the present disclosure, a back pointer table for the partially used blocks is generated. FIG. 7C illustrates the back pointer table based on FIG. 7A, including usage information of the source blocks grouped according to the numbers of back pointers.

An appropriate block combination is selected to meet the usage requirements $$86\% < \sum_{i=1}^{NSP} U_i \leq 100\%.$$

When NSP=3, by traversing all patterns, the block combinations selected are as follows:
1-1-6 pattern: {37, 21, 25};
1-2-5 pattern: {48, 27, 22}, {52, 22, 26}, {49, 12, 33};
1-3-4 pattern: {81, 5, 13};
2-2-4 pattern: {53, 18, 24};
2-3-3 pattern: None.

FIG. 7D illustrates blocks selected when NSP=3, where the selected blocks are indicated as being removed out of the table and will not participate in subsequent selections (NSP=2). Then, the NSP is progressively decreased to 2, and by traversing all patterns, the block combinations selected are as follows:
1-7 pattern: None;
2-6 pattern: {39, 60}, {47, 46};
3-5 pattern: {49, 41}, {48, 43};
4-4 pattern: None.

FIG. 7E illustrates blocks selected when NSP=2, where the selected blocks are indicated as being removed out of the table, and the blocks that have already been selected when NSP=3 are not shown. It can thus be obtained that the number of blocks freed up is 6*2+4*1=16, and compared with the existing solution, the space reclaiming performance is increased by (16−10)/10=60%.

The foregoing describes illustrative embodiments of the present disclosure with reference to FIGS. 1-7E. Compared with the prior art, some embodiments of the present disclosure can automatically adjust the number of source blocks participating in merging according to the current state (capacity and performance) of the storage system, thereby improving the efficiency of space reclaiming. In addition, embodiments of the present disclosure further provide an algorithm for selecting source blocks from different queues to deal with the source blocks with uneven usage distribution. Even for the source blocks with uneven usage distribution, more space can be freed up, thereby improving the efficiency of space reclaiming.

Figure 8:
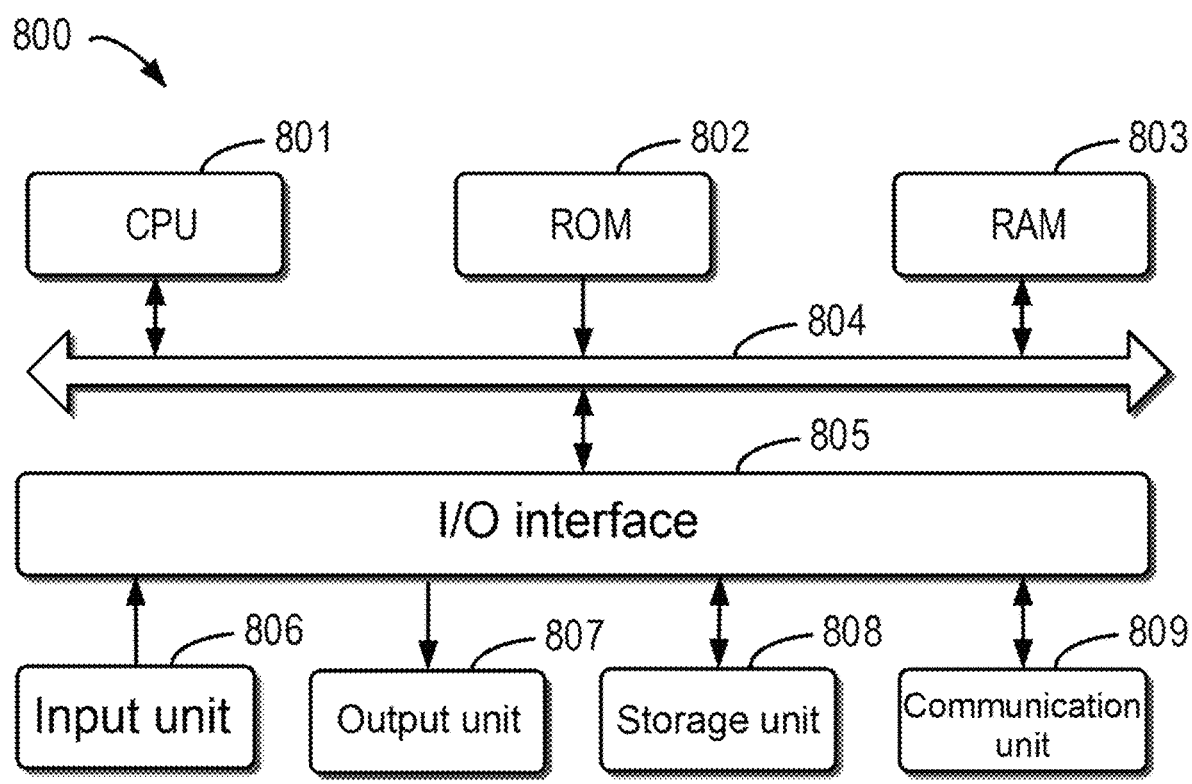
FIG. 8 is a block diagram of an example device applicable to implement some embodiments of the present disclosure.

FIG. 8 is a block diagram of an example electronic device applicable to implement some embodiments of the present disclosure.

As shown in FIG. 8, a device 800, which is an illustrative example of what is also referred to herein as an electronic device, includes a central processing unit (CPU) 801 that can execute various appropriate actions and processing in accordance with computer program instructions stored in a read-only memory (ROM) 802 or computer program instructions loaded onto a random access memory (RAM) 803 from a storage unit 808. Various programs and data required for the operation of the device 800 may also be stored in the RAM 803. The CPU 801, the ROM 802, and the RAM 803 are connected to each other through a bus 804. An input/output (I/O) interface 805 is also connected to the bus 804.

A plurality of components in the device 800 are connected to the I/O interface 805, including: an input unit 806, such as a keyboard and a mouse; an output unit 807, such as various types of displays and speakers; the storage unit 808, such as a magnetic disk and an optical disc; and a communication unit 809, such as a network card, a modem, and a wireless communication transceiver. The communication unit 809 allows the device 800 to exchange information/data with other devices via a computer network, such as the Internet, and/or various telecommunication networks.

The various processes and processing described above can be executed by the CPU 801. For example, in some embodiments, methods or processes may be implemented as a computer software program that is tangibly included in a machine-readable medium such as the storage unit 808. In some embodiments, some or all of the computer program may be loaded and/or installed onto the device 800 via the ROM 802 and/or the communication unit 809. One or more actions of methods or processes described above may be performed when the computer program is loaded into the RAM 803 and executed by the CPU 801.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device through a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for performing the operations of the present disclosure may be assembly instructions, Instruction Set Architecture (ISA) instructions, machine instructions, machine-related instructions, microcode, firmware instructions, state setting data, or source code or object code written in any combination of one or more programming languages, including object-oriented programming languages such as Smalltalk and C++, and conventional procedural programming languages such as C language or the like. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, apparatus (system), and computer program product according to embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or other programmable data processing apparatuses to produce a machine, such that these instructions, when executed by the processing unit of the computer or other programmable data processing apparatuses, produce means for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored thereon includes an article of manufacture that includes instructions that implement various aspects of the functions/actions specified in one or more blocks in the flow charts and/or block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process, such that the instructions executed on the computer, other programmable data processing apparatuses, or other devices implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The terminology used herein is chosen to best explain the principles and practical applications of the various embodiments and their associated technological improvements, so as to enable those of ordinary skill in the art to understand the various embodiments disclosed herein.

What is claimed is:

1. A method for reclaiming a storage space, comprising:
determining a number of a plurality of blocks that can be selected to have data portions thereof merged into one block based on a space usage of a storage system;
selecting a block combination for merging from a plurality of partially used blocks of the storage system, the block combination comprising the determined number of partially used blocks; and
reclaiming a storage space from the storage system by merging the partially used blocks in the block combination into one block;
wherein each of the plurality of partially used blocks has one or more associated back pointers, and selecting a block combination from the plurality of partially used blocks of the storage system comprises:
selecting the block combination based on the numbers of corresponding back pointers of the plurality of partially used blocks.

2. The method according to claim 1, further comprising:
determining a usage threshold for merging based on the space usage of the storage system,
wherein the selecting a block combination from a plurality of partially used blocks of the storage system comprises: selecting the block combination such that a sum of usages of the partially used blocks in the block combination exceeds the usage threshold.

3. The method according to claim 1, wherein selecting the block combination from a plurality of partially used blocks of the storage system comprises:
grouping the plurality of partially used blocks to form a back pointer table based on the numbers of the corresponding back pointers of the plurality of partially used blocks; and
selecting the block combination by traversing the back pointer table, wherein a sum of the numbers of back pointers of the partially used blocks in the block combination does not exceed a predetermined threshold.

4. The method according to claim 3, wherein the sum of the numbers of back pointers is equal to the predetermined threshold.

5. The method according to claim 1, wherein the number of the plurality of blocks that can be selected to have data portions thereof merged into one block increases with an increase of the space usage of the storage system.

6. The method according to claim 2, wherein the usage threshold decreases with an increase of the space usage.

7. The method according to claim 1, further comprising:
allowing the number of the plurality of blocks that can be selected to have data portions thereof merged into one block to decrease progressively; and
selecting another block combination from the remaining partially used blocks of the storage system, the other block combination comprising the progressively decreased number of partially used blocks.

8. An electronic device, comprising:
at least one processor; and
at least one memory coupled to the at least one processor and storing instructions, wherein the instructions, when executed by the at least one processor, cause the electronic device to perform actions comprising:
determining a number of a plurality of blocks that can be selected to have data portions thereof merged into one block based on a space usage of a storage system;
selecting a block combination for merging from a plurality of partially used blocks of the storage system, the block combination comprising the determined number of partially used blocks; and
reclaiming a storage space from the storage system by merging the partially used blocks in the block combination into one block;
wherein each of the plurality of partially used blocks has one or more associated back pointers, and selecting a block combination from the plurality of partially used blocks of the storage system comprises:
selecting the block combination based on the numbers of corresponding back pointers of the plurality of partially used blocks.

9. The electronic device according to claim 8, wherein the actions further comprise:
determining a usage threshold for merging based on the space usage of the storage system,
wherein the selecting a block combination from a plurality of partially used blocks of the storage system comprises: selecting the block combination such that a sum of usages of the partially used blocks in the block combination exceeds the usage threshold.

10. The electronic device according to claim 2, wherein selecting the block combination from a plurality of partially used blocks of the storage system comprises:
grouping the plurality of partially used blocks to form a back pointer table based on the numbers of the corresponding back pointers of the plurality of partially used blocks; and
selecting the block combination by traversing the back pointer table, wherein a sum of the numbers of back pointers of the partially used blocks in the block combination does not exceed a predetermined threshold.

11. The electronic device according to claim 10, wherein the sum of the numbers of back pointers is equal to the predetermined threshold.

12. The electronic device according to claim 8, wherein the number of the plurality of blocks that can be selected to have data portions thereof merged into one block increases with an increase of the space usage of the storage system.

13. The electronic device according to claim 9, wherein the usage threshold decreases with an increase of the space usage.

14. The electronic device according to claim 8, wherein the actions further comprise:
allowing the number of the plurality of blocks that can be selected to have data portions thereof merged into one block to decrease progressively; and
selecting another block combination from the remaining partially used blocks of the storage system, the other block combination comprising the progressively decreased number of partially used blocks.

15. A computer program product tangibly stored on a non-transitory computer-readable storage medium and comprising machine-executable instructions, wherein the machine-executable instructions, when executed by a machine, cause the machine to perform actions comprising:
determining a number of a plurality of blocks that can be selected to have data portions thereof merged into one block based on a space usage of a storage system;
selecting a block combination for merging from a plurality of partially used blocks of the storage system, the block combination comprising the determined number of partially used blocks; and
reclaiming a storage space from the storage system by merging the partially used blocks in the block combination into one block;
wherein each of the plurality of partially used blocks has one or more associated back pointers, and selecting a block combination from the plurality of partially used blocks of the storage system comprises:
selecting the block combination based on the numbers of corresponding back pointers of the plurality of partially used blocks.

16. The computer program product according to claim 15, wherein the actions further comprise:
determining a usage threshold for merging based on the space usage of the storage system,
wherein the selecting a block combination from a plurality of partially used blocks of the storage system comprises: selecting the block combination such that a sum of usages of the partially used blocks in the block combination exceeds the usage threshold.

17. The computer program product according to claim 15, wherein selecting the block combination from a plurality of partially used blocks of the storage system comprises:
grouping the plurality of partially used blocks to form a back pointer table based on the numbers of the corresponding back pointers of the plurality of partially used blocks; and
selecting the block combination by traversing the back pointer table, wherein a sum of the numbers of back pointers of the partially used blocks in the block combination does not exceed a predetermined threshold.

18. The computer program product according to claim 17, wherein the sum of the numbers of back pointers is equal to the predetermined threshold.

19. The computer program product according to claim 15, wherein the number of the plurality of blocks that can be selected to have data portions thereof merged into one block increases with an increase of the space usage of the storage system.

20. The computer program product according to claim 15, wherein the actions further comprise:
- allowing the number of the plurality of blocks that can be selected to have data portions thereof merged into one block to decrease progressively; and
- selecting another block combination from the remaining partially used blocks of the storage system, the other block combination comprising the progressively decreased number of partially used blocks.

* * * * *

UNITED STATES PATENT AND TRADEMARK OFFICE
CERTIFICATE OF CORRECTION

| | | |
|---|---|---|
| PATENT NO. | : 12,455,686 B1 | Page 1 of 1 |
| APPLICATION NO. | : 18/667218 | |
| DATED | : October 28, 2025 | |
| INVENTOR(S) | : Shuangshuang Liang et al. | |

It is certified that error appears in the above-identified patent and that said Letters Patent is hereby corrected as shown below:

In the Claims

Claim 10, Column 13, Line 53, please delete "according to claim 2" and insert therefor --according to claim 8--

Signed and Sealed this
Twenty-fifth Day of November, 2025

John A. Squires
*Director of the United States Patent and Trademark Office*